(12) United States Patent
Morimoto et al.

(10) Patent No.: US 7,013,075 B2
(45) Date of Patent: *Mar. 14, 2006

(54) VARIABLE OPTICAL ATTENUATOR

(75) Inventors: Masahito Morimoto, Tokyo (JP);
Kouki Sato, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 147 days.

This patent is subject to a terminal disclaimer.

(21) Appl. No.: 10/666,835

(22) Filed: Sep. 19, 2003

(65) Prior Publication Data

US 2005/0191024 A1    Sep. 1, 2005

Related U.S. Application Data

(63) Continuation-in-part of application No. 10/041,087, filed on Dec. 28, 2001, now Pat. No. 6,636,683.

(30) Foreign Application Priority Data

Jan. 26, 2001  (JP)  ............................... 2001-18749

(51) Int. Cl.
*G02B 6/00* (2006.01)
*G02B 6/32* (2006.01)
(52) U.S. Cl. ........................... 385/140; 385/25; 385/33
(58) Field of Classification Search ................ 385/33, 385/140, 25
See application file for complete search history.

(56) References Cited

U.S. PATENT DOCUMENTS

| 5,974,216 | A | | 10/1999 | Nakaya |
| 6,130,984 | A | * | 10/2000 | Shen et al. .................. 385/140 |
| 6,163,643 | A | | 12/2000 | Bergmann et al. |
| 6,404,970 | B1 | * | 6/2002 | Gransden et al. ............ 385/140 |
| 6,636,683 | B1 | * | 10/2003 | Morimoto et al. ........... 385/140 |

* cited by examiner

*Primary Examiner*—Sarah U Song
(74) *Attorney, Agent, or Firm*—Knobbe, Martens, Olson & Bear, LLP

(57) ABSTRACT

First and second optical fibers are opposed to each other, between which first and second lenses constituting a lens system having an optical axis coincident with those of the optical fibers are arranged with a gap therebetween in the direction of the optical axis. The actuators, ect are used to move the first and second lenses with electrostatic forces, in opposite directions along the optical axes of the optical fibers by the same amount at the same time. Thereby, the spot size of the light incident on the optical fiber on the reception side is changed while maintaining the light propagating between the first optical fiber and the second optical fiber point-symmetric in mode field shape. This changes the coupling efficiency between the first optical fiber and the second optical fiber, allowing an adjustment in light power.

14 Claims, 8 Drawing Sheets

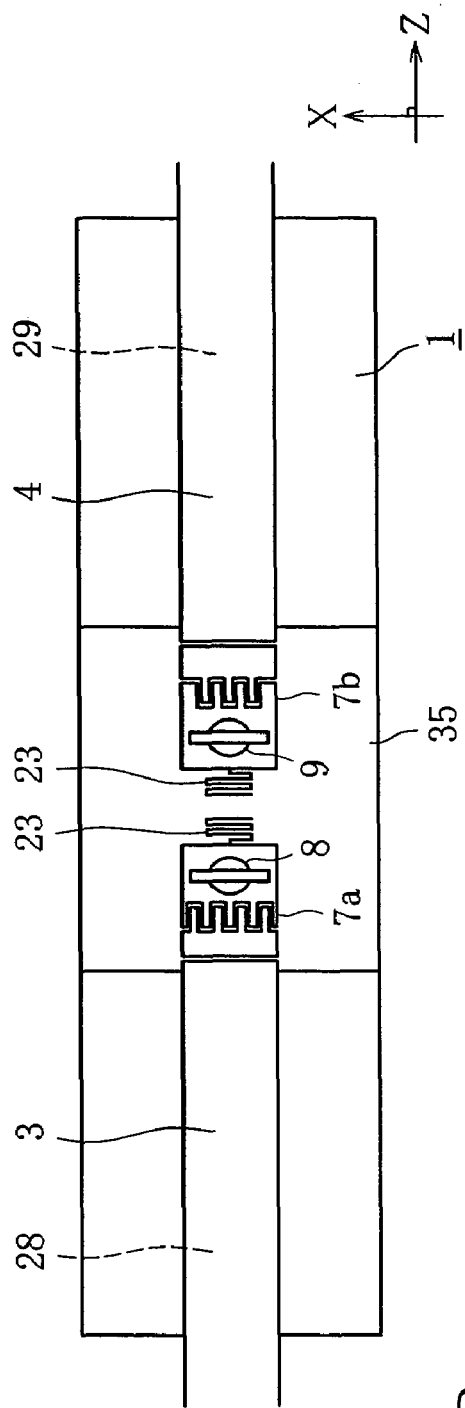
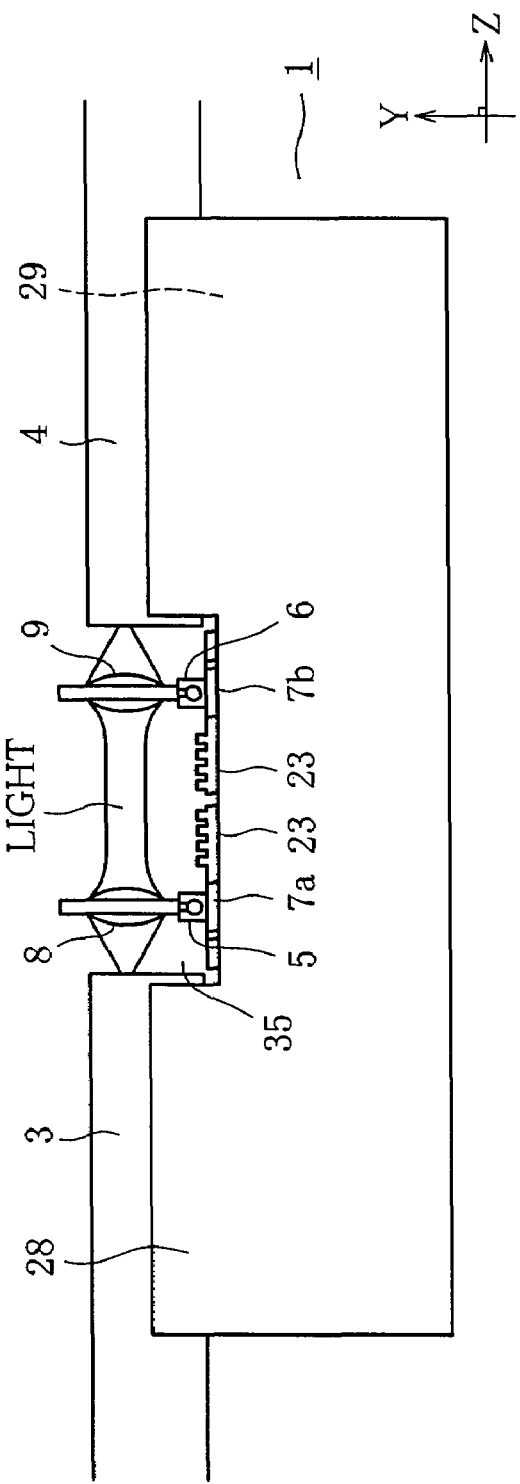

VARIABLE OPTICAL ATTENUATOR

RELATED APPLICATION

This application incorporates by reference in its entirety and is a continuation-in-part of U.S. application Ser. No. 10/041,087, filed Dec. 28, 2001 now U.S. Pat. No. 6,636,683.

BACKGROUND OF THE INVENTION

1. Field of the Invention

The invention relates to a variable optical attenuator of light for use in optical communications.

2. Prior Art

Presently, with the wavelength multiplexing transmission systems in optical communications, there is known such a system as shown in FIG. 1. This system has a plurality of optical amplifiers 31 arranged on a transmission line 30 of wavelength multiplexed light at relaying positions so that the optical amplifiers 31 amplify the wavelength multiplexed transmission light. Such transmission accompanied with the amplification of wavelength multiplexed transmission light by a plurality of optical amplifiers 31 allows long-distance wavelength multiplexing transmission.

In the wavelength multiplexing transmission system shown in FIG. 1, a function of amplifying multi-wavelength light collectively is requires of each optical amplifier 31. For the wavelength multiplexing transmission system to improve in transmission quality, it is also required that the plurality of optical amplifiers 31 each perform optical amplification without a great difference in power among the individual wavelengths of the transmission light amplified. To reduce this differences in power among the wavelengths of the transmission light, it has been suggested that a variable optical attenuator having the function of uniformizing the multi-wavelength light to a desired power collectively be arranged, for example, in each of the optical amplifiers 31.

Among the requirements for this type of variable optical attenuator are: ① a constant optical attenuation at each wavelength of the multi-wavelength light, or equivalently, no variation or smaller variations in optical attenuation with respect to changes in wavelength; ② an attainable optical attenuation of −30 dB or higher; ③ resistance to high optical input power; and ④ a compact size.

SUMMARY OF THE INVENTION

An object of the present invention is to provide a compact variable optical attenuator capable of attaining an optical attenuation of, e.g., −30 dB or higher, reducing the wavelength dependency of the optical attenuation, suppressing the occurrence of a polarization dependency loss, and withstanding high optical input power as well.

To achieve the foregoing object, the present invention provides a variable optical attenuator comprising: a first optical part; a second optical part opposed to the first optical part with a predetermined gap therebetween; and optical coupling efficiency adjusting means for adjusting a coupling efficiency between the first optical part and the second optical part while maintaining light propagating between the first optical part and the second optical part point-symmetric in mode field shape, wherein the optical coupling efficiency adjusting means adjusts the coupling efficiency between the first optical part and the second optical part for an adjustment in light power.

BRIEF DESCRIPTION OF THE DRAWINGS

FIG. 6A is a plan view showing the configuration of essential parts of a variable optical attenuator according to an embodiment of the present invention;

FIG. 6B is a side view showing the configuration of essential parts of a variable optical attenuator according to an embodiment of the present invention;

DETAILED DESCRIPTION

Figure 1:
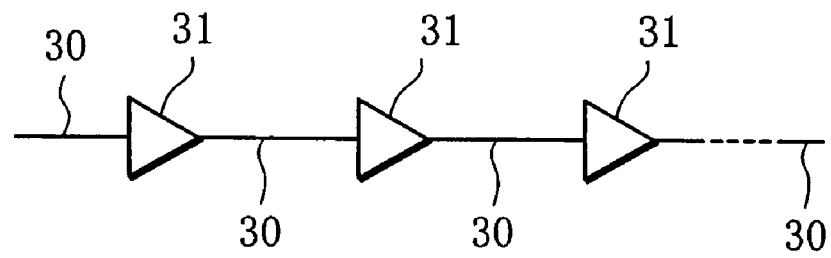
FIG. 1 is an explanatory diagram showing a configuration example of a wavelength multiplexing transmission system.
Figure 2:
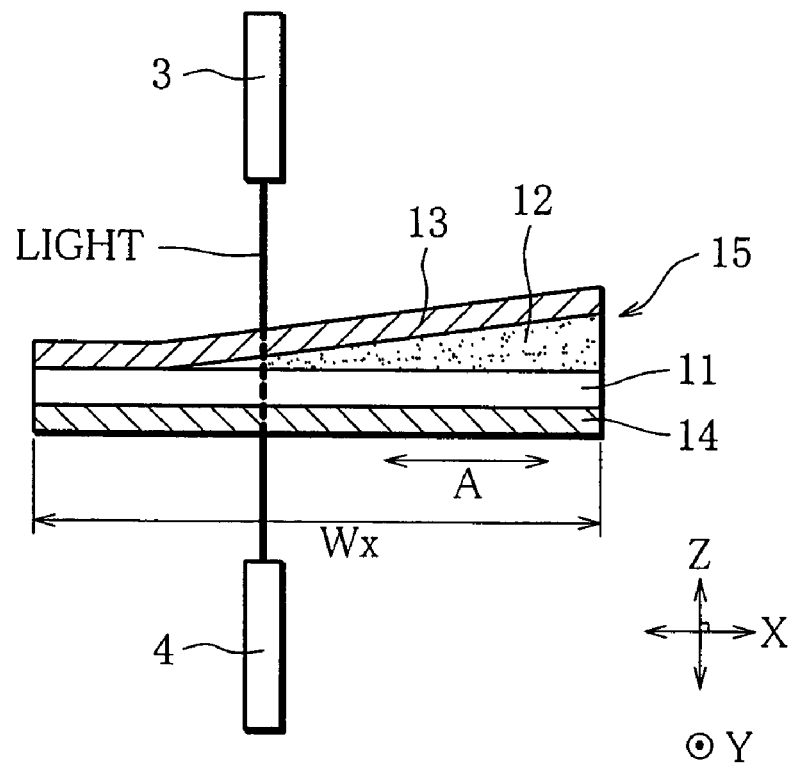
FIG. 2 is a schematic diagram showing the configuration of essential parts of a conventional variable optical attenuator (No. 1)

FIG. 2 shows an example of a conventional variable optical attenuator. In this variable optical attenuator, an optical absorption member 15 having a glass substrate 11 and an optical absorption film 12 is arranged on the optical path of light propagating between optical parts, or optical fibers 3 and 4. The glass substrate 11 is placed on an XY plane generally orthogonal to the Z-axis with the direction of the optical axes of the optical fibers 3 and 4 as the Z-axis. The optical absorption film 12 is deposited on the top side of the glass substrate 11. The optical absorption film 12 has a thickness distribution over the XY plane, and is formed, for example, to gradually increase in the thickness in the direction of the Z-axis as getting closer to the right side of the diagram in the X direction. The top side of the optical absorption film 12 and the bottom side of the glass substrate 11 are given anti-reflecting coatings 13 and 14, respectively.

In this conventional variable optical attenuator shown in FIG. 2, when the optical absorption member 15 is moved along the X-axis as shown by the arrow A in the diagram, the optical absorption film 12 varies in the thickness on the optical path between the optical fibers 3 and 4. This variation in the thickness of the optical absorption film 12 causes a change in optical attenuation. Thereby the optical attenuation is controlled.

Figure 3A:
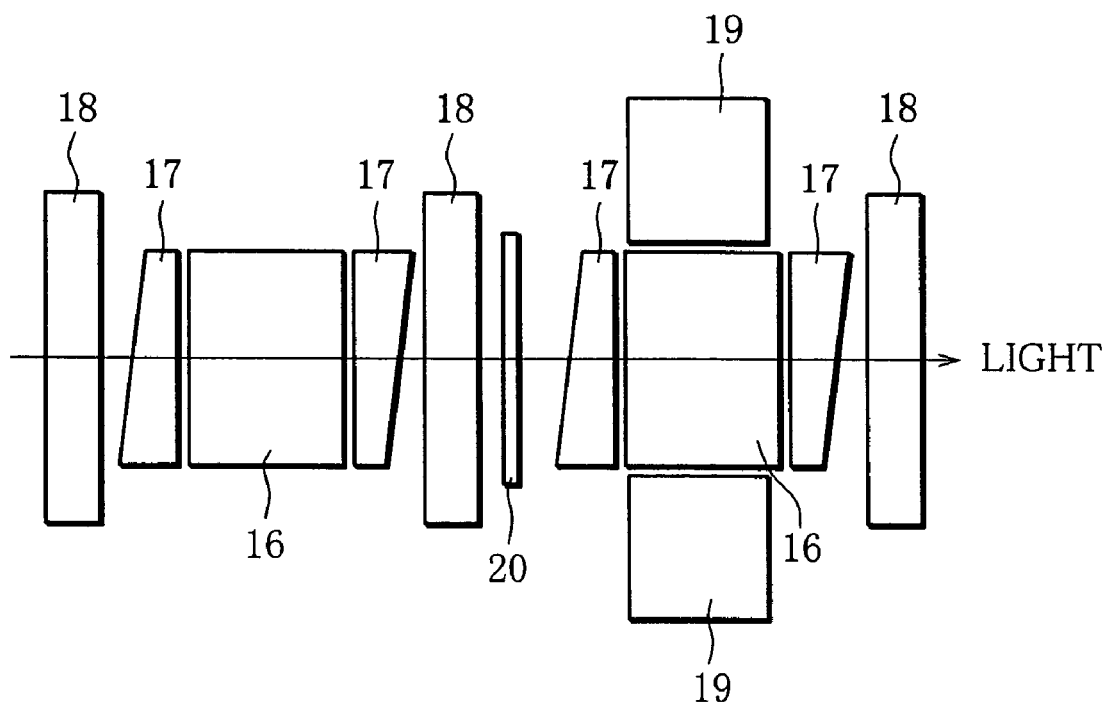
FIG. 3A is a schematic diagram showing the configuration of essential parts of a conventional variable optical attenuator (No. 2)

FIG. 3A shows another example of a conventional variable optical attenuator. In this variable optical attenuator, Faraday rotators 16 are arranged on the optical path. Birefringent wedge plates 17 and permanent magnets 18 are arranged to sandwich these Faraday rotators 16 therebetween in the direction of the optical path. In addition, electromagnets 19 are arranged to sandwich one of the Faraday rotators 16 therebetween in a direction orthogonal to the optical path. The reference numeral 20 in the diagram represents a wave plate.

Figure 3B:
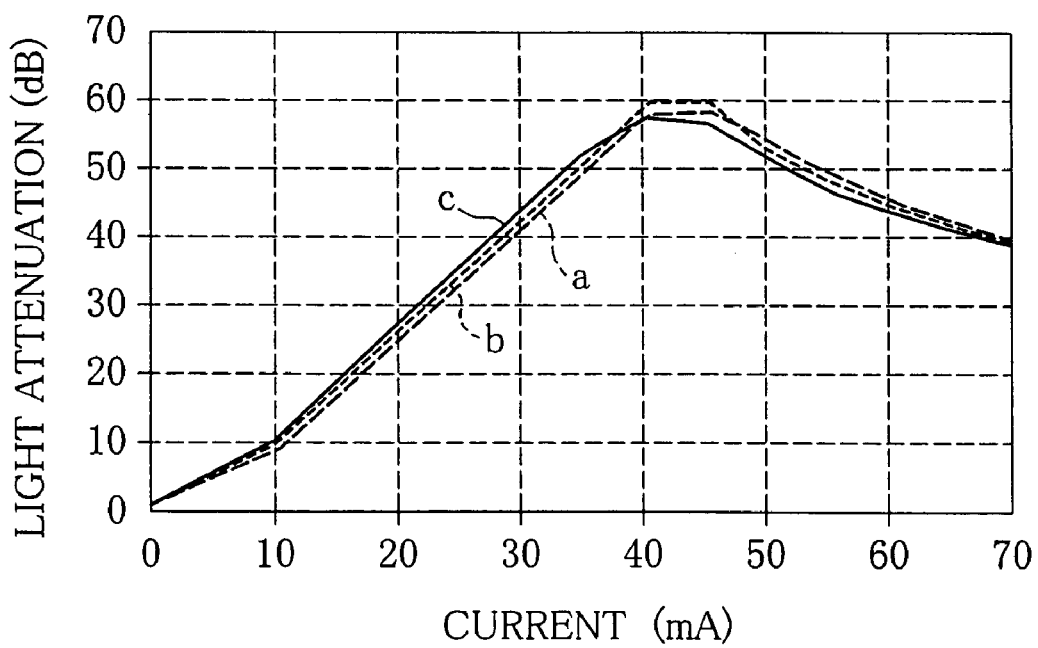
FIG. 3B is a graph showing the wavelength dependence of the optical attenuation of FIG. 3A.

In this conventional variable optical attenuator shown in FIG. 3A, the direction of magnetization of the Faraday rotator 16 is changed by the current applied to the electromagnets 19, so as to control the optical attenuation by means of the Faraday effect. Here, the relationship between the current applied to the electromagnets 19 and the optical attenuation is shown in the graph of FIG. 3B with the wavelength of light as a parameter.

Figure 4A:
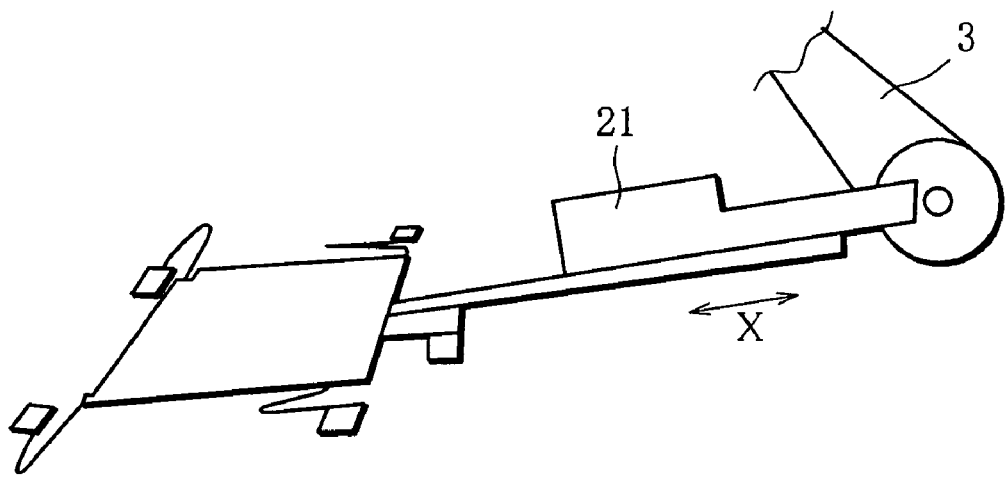
FIG. 4A is a schematic diagram showing the configuration of essential parts of a conventional variable optical attenuator (No. 3)

FIG. 4A shows still another example of a conventional variable optical attenuator. This variable optical attenuator is provided with a linear shutter plate 21 to be placed on the optical path of light emitted from an optical fiber 3, and a moving mechanism 22 of this shutter plate 21.

Figure 4B:
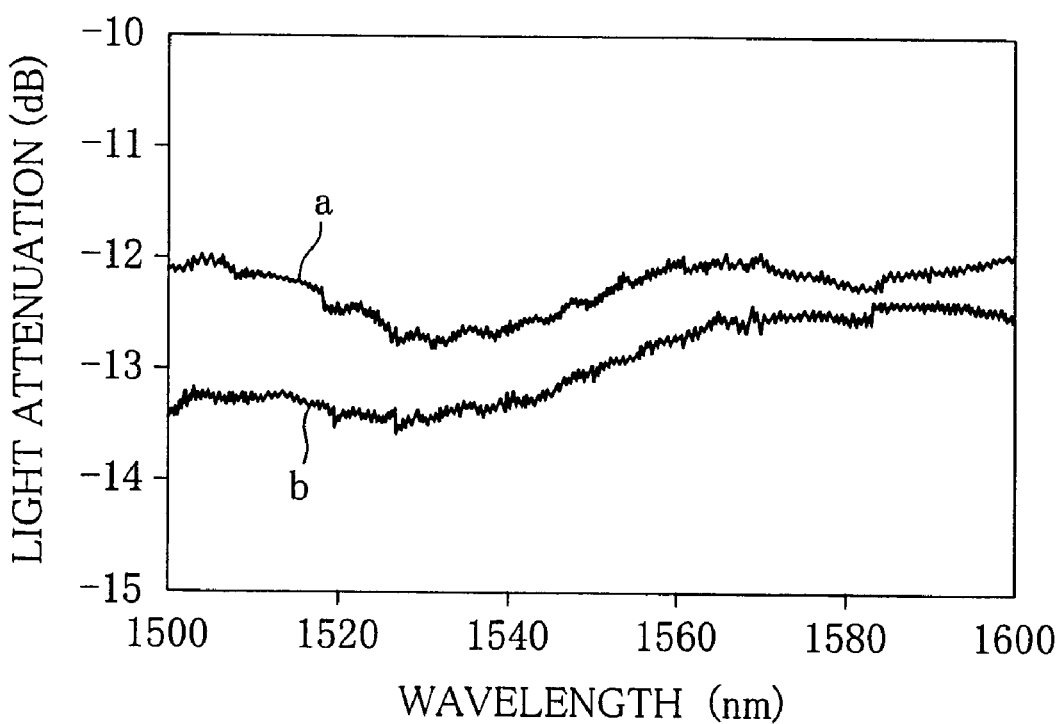
FIG. 4B is a graph showing the wavelength dependence of the optical attenuation of FIG. 4B.

In this conventional variable optical attenuator shown in FIG. 4A, the moving mechanism 22 moves the shutter plate 21 in the X directions in the diagram to interrupt the optical path of the light emitted from the optical fiber 3. The optical attenuation is controlled according to the amount of light interrupted by this shutter plate 21. Here, the relationship between the wavelength of the light propagating through the optical fiber 3 and the optical attenuation is shown in the graph of FIG. 4B.

Incidentally, the two types of variable optical attenuators shown in FIGS. 2 and 3A have already been put to practical use. The variable optical attenuator shown in FIG. 4A has been disclosed in IEEE Journal of Selected Topics in Quantum Electronics, Vol. 5, No. 1, January/February 1999, pp. 18–25.

In the variable optical attenuator shown in FIG. 2, however, the provision of an optical attenuation of −30 dB or higher by using the optical absorption film 12, given the present technologies, requires that the optical absorption film 12 be increased in thickness. This involves increasing the width Wx of the optical absorption film 12 to the order of 1 cm. As a result, there has been a problem of difficult miniaturization of the apparatus because such moving means as a motor for moving the optical absorption film 12 and the rest becomes indispensable. Furthermore, in the variable optical attenuator provided with the optical absorption film 12, the optical absorption film 12 generates heat when the incident light is high in power. Therefore, there has been another problem that incident light having a power above a certain extent might destroy the optical absorption film 12.

In the variable optical attenuator shown in FIG. 3A, the optical attenuation has a great dependence on wavelengths as shown by the characteristic lines a, b, and c in FIG. 3B. Accordingly, there has been a problem that even if a desired optical attenuation is obtained at some wavelengths, the desired optical attenuation cannot be obtained at different wavelengths. Here, the characteristic line a shows the optical attenuations at a wavelength of 1535 nm, the characteristic line b the optical attenuations at a wavelength of 1549 nm, and the characteristic line c the optical attenuations at a wavelength of 1565 nm. In addition, since not-shown polarizers and analyzers are required aside from the electromagnets 19, the Faraday rotators 16, and the permanent magnets 18, there have been problems of complicated configuration and difficult miniaturization of the apparatus.

Furthermore, the variable optical attenuator shown in FIG. 4A has also had the problem that the optical attenuation has a great dependence on wavelengths as shown by the characteristic lines a and b in FIG. 4B.

The characteristic line a shows the wavelength dependence of the optical attenuation at varying wavelengths with the shutter plate 21 fixed to a position where an attenuation of 12.2 dB is obtained at a wavelength of 1500 nm. Here, a comparison between the maximum and minimum optical attenuations in the range of wavelengths of 1500–1600 nm finds a difference of approximately 0.8 dB in optical attenuation.

The characteristic line b shows the wavelength dependence of the optical attenuation at varying wavelengths with the shutter plate 21 fixed to a position where an attenuation of 13.5 dB is obtained at a wavelength of 1500 nm. Here, a comparison between the maximum and minimum optical attenuations in the range of wavelengths of 1500–1600 nm finds a difference of approximately 1 dB in optical attenuation.

As described above, in the variable optical attenuator shown in FIG. 4A, the wavelength dependence of the optical attenuation becomes more significant as the optical attenuation increases. For obtaining an optical attenuation of −30 dB, the wavelength dependence of the optical attenuation becomes still greater than on the characteristic line b. Thus, practical application has been difficult unless this problem about the wavelength dependence of the optical attenuation is solved.

Additionally, in this configuration, the mode field of the light emitted from the optical fiber 3 is interrupted by the shutter plate 21. Therefore, a point-asymmetric diffraction pattern spreading because of diffraction is formed on the end of an optical fiber at the reception side. This diffraction pattern spreads out beyond the size of the optical-fiber end, and the light to be received near the rim of the optical-fiber end varies in reflectance depending on the direction of polarization. This has caused another problem of the occurrence of a polarization dependency loss.

The problem about the wavelength dependence of the optical attenuation is ascribable to the wavelength dependence of the mode field diameter such that the mode field diameter of the light emitted from the optical fiber 3 increases as the light propagating through the optical fiber 3 shifts toward longer wavelengths, and the mode field diameter decreases as the light shifts reversely toward shorter wavelengths.

It was found that the polarization dependency loss occurring in such a variable optical attenuator as shown in FIG. 4A tended to increase with an increase in the amount of light interrupted by the shutter plate 21. The reason for this seems that as the amount of light interrupted by the shutter 21 increases, the polarization dependency loss becomes relatively greater because the mode field shape of the light resulting from the diffraction spreads out with further asymmetry and the light power decreases as well.

Figure 5:
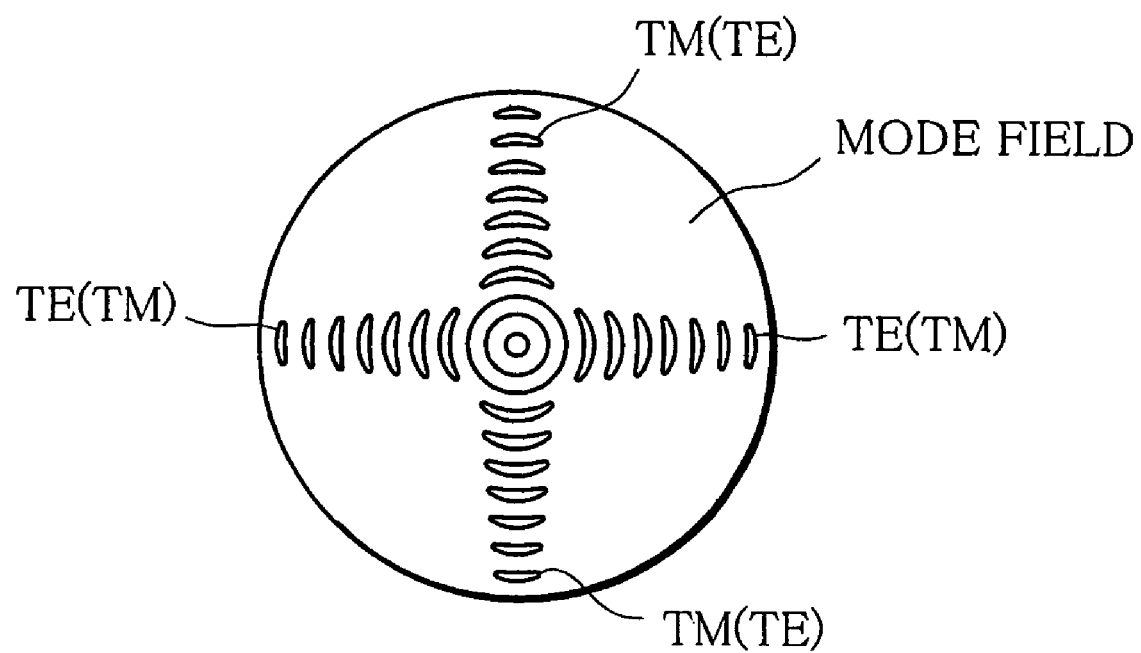
FIG. 5 is an explanatory diagram showing a diffraction pattern of light spreading out in a point-symmetric fashion.

No polarization dependency loss will occur, however, when the above-described diffraction pattern spreads out in a point-symmetric fashion about the optical axis. For example, as shown in FIG. 5, light TE-polarized at top and bottom ends is TM-polarized at right and left ends, or reversely, light TM-polarized at the tom and bottom ends is TE-polarized at the right and left ends. Eventually, polarization-based differences in reflectance will cancel out each other vertically and horizontally even near the rim of a diffraction pattern if symmetrical portions lie alike vertically and horizontally. Consequently, there will arise no polarization dependency loss.

In view of this, the present inventor provides a configuration for allowing a change in the optical coupling efficiency between first and second optical parts with the mode field shape of light maintained point-symmetric. Hereinafter, a variable optical attenuator according to an embodiment of the present invention will be described with reference to the drawings.

Initially, description will be given of the configuration of an example of the variable optical attenuator according to the present embodiment.

As shown in FIGS. 6A and 6B, the variable optical attenuator according to the present embodiment has a silicon substrate 1 as a semiconductor substrate. A recess 35 is formed in the center of this silicon substrate 1. V grooves 28 and 29 are formed on the silicon substrate 1 at both sides longitudinally across this recess 35. A first optical fiber 3, or a first optical part, is inserted and fixed to the V groove 28. A second optical fiber 4, or a second optical part to be opposed to the first optical fiber 3 with a predetermined gap therebetween, is inserted and fixed to the V groove 29. The connecting end of the first optical fiber 3 and the connecting end of the second optical fiber 4 are opposed to each other with a gap of, e.g., about 750 µm.

Two comb-like actuators 7a and 7b are arranged on the bottom of the recess 35 in between the first optical fiber 3 and the second optical fiber 4. Hinges 5 and 6 are formed on these two actuators 7a and 7b, respectively, by using semiconductor microfabrication technologies. A first lens 8 and a second lens 9 are formed on these hinges 5 and 6, respectively, also by using semiconductor microfabrication technologies. Thus, the first and second lenses 8 and 9 are erected upright on the silicon substrate 1 via the hinges 5 and 6, etc.

These first and second lenses 8 and 9 are arranged with a predetermined gap therebetween in the direction of the optical axes of the first and second optical fibers 3 and 4 (the Z direction) to constitute a lens system having an optical axis coincident with those of the first and second optical fibers 3 and 4. That is, the optical axes of the first optical fiber 3, the first lens 8, the second lens 9, and the second optical fiber 4 are put in agreement with one another. Both the first and second lenses 8 and 9 have a focal length of about 40 µm, for example.

The comb-like actuators 7a and 7b are formed on the recess 35 of the silicon substrate 1 by micromachining technologies including a sacrificial layer deposition process and an etching process which are known publicly. In addition, springs 23 for balancing the forces of the actuators 7a and 7b and voltage applying means (not shown) for applying a desired voltage to the actuators 7a and 7b are provided. Thereby, lens moving means is constituted of the actuators 7a and 7b, springs 23, and voltage applying means for moving the first and second lenses 8 and 9 arranged on the actuators 7a and 7b via the hinges 5 and 6. The lens moving means is a kind of micro electro mechanical system (MEMS).

Using the lens moving means, the first and second lens 8 and 9 are moved along the optical axes of the optical fibers 3 and 4, so that the coupling efficiency between the first optical fiber 3 and the second optical fiber 4 is changed for an adjustment in light power. Specifically, a desired voltage is applied to the actuators 7a and 7b so that the actuators move back and forth in the Z direction due to electrostatic forces, moving the first lens 8 and the second lens 9 along the Z direction. Here, the first lens 8 and the second lens 9 are moved in opposite directions by the same distance at the same time.

Incidentally, at initial positions, both the distance between the connecting end of the first optical fiber 3 and the first lens 8 and the distance between the connecting end of the second optical fiber 4 and the second lens 9, or the fiber-end-to-lens distances, are 330 µm, for example. The voltage applied to the actuators 7a and 7b can be varied up to 100 V. Given that this voltage applied is 100 V, the fiber-end-to-lens distances mentioned above decrease to, e.g., 270 µm each. FIGS. 6A and 6B show situations with different fiber-end-to-lens distances.

The variable optical attenuator according to the present embodiment is configured as described above. When a voltage is applied to the actuators 7a and 7b to operate the lens moving means, both the distance between the connecting end of the first optical fiber 3 and the first lens 8 and the distance between the connecting end of the second optical fiber 4 and the second lens 9, i.e., the fiber-end-to-lens distances vary by the same amount. This changes the spot size of the light incident on the optical fiber at the reception side while maintaining the light propagating between the first optical fiber 3 and the second optical fiber 4 point-symmetric in mode field shape, with a change in the coupling efficiency between the first optical fiber 3 and the second optical fiber 4.

Figure 7:
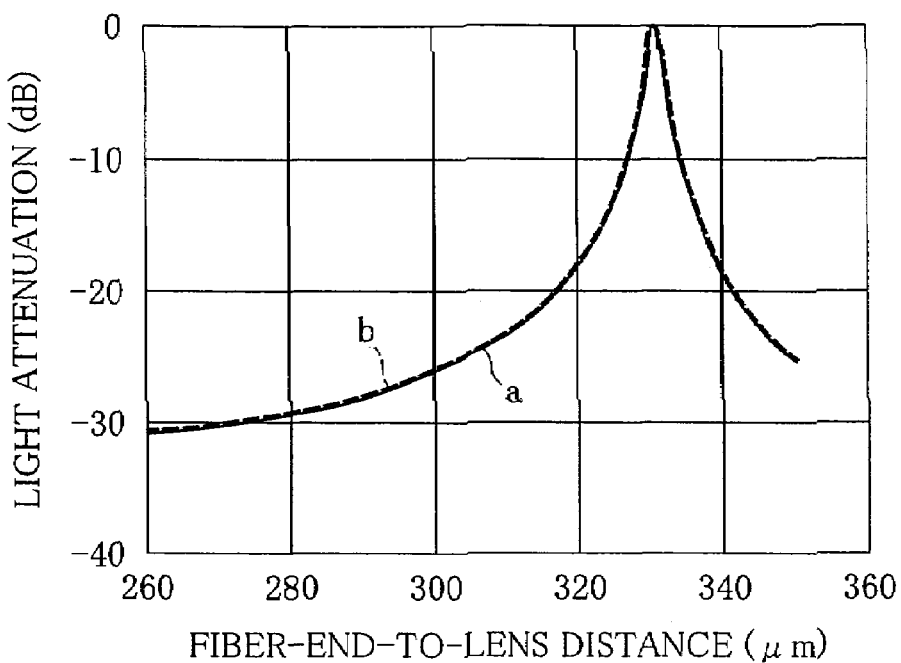
FIG. 7 is a graph showing the correlation data between changes in fiber-end-to-lens distance and variations in optical attenuation of the variable optical attenuator of FIGS. 6A and 6B.

Consequently, as shown in FIG. 7, the optical attenuation changes with varying fiber-end-to-lens distances. In this FIG. 7, the characteristic lines a and b show characteristics at wavelengths of 1530 nm and 1580 nm, respectively. As is evident from these characteristic lines a and b of FIG. 7, an optical attenuation of −30 dB and higher is attained. The changes in optical attenuation due to varying fiber-end-to-lens distances are almost identical at a wavelength of 1530 nm and at a wavelength of 1580 nm. Given an optical attenuation of −30 dB, the difference in optical attenuation between wavelengths of 1530 nm and 1580 nm is as small a value as approximately 0.36 dB or less. That is, the optical attenuation has little wavelength dependence.

Figure 8:
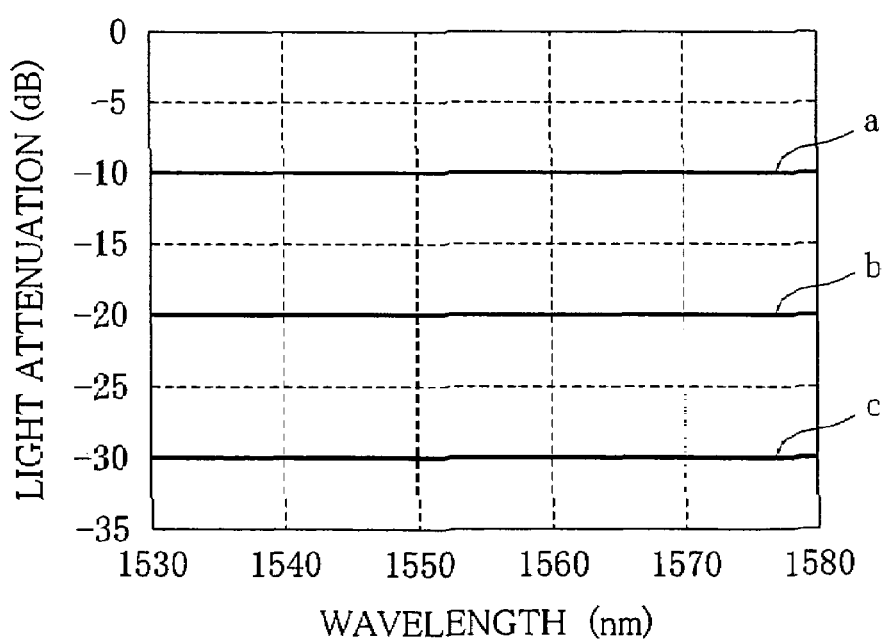
FIG. 8 is a graph showing the wavelength dependence of the optical attenuation in the variable optical attenuator of FIGS. 6A and 6B.

For further examination on the wavelength dependence of the optical attenuation, the optical attenuation was measured for changes with varying wavelengths at attenuations around 10, 20, and 30 dB. In result, as shown in FIG. 8, little change was found in the optical attenuation for wavelength variations ranging from 1530 nm to 1580 nm at any of the attenuations around 10 dB (characteristic line a), 20 dB (characteristic line b), and 30 dB (characteristic line c). That is, it was confirmed that the optical attenuation has little wavelength dependence.

Figure 9:
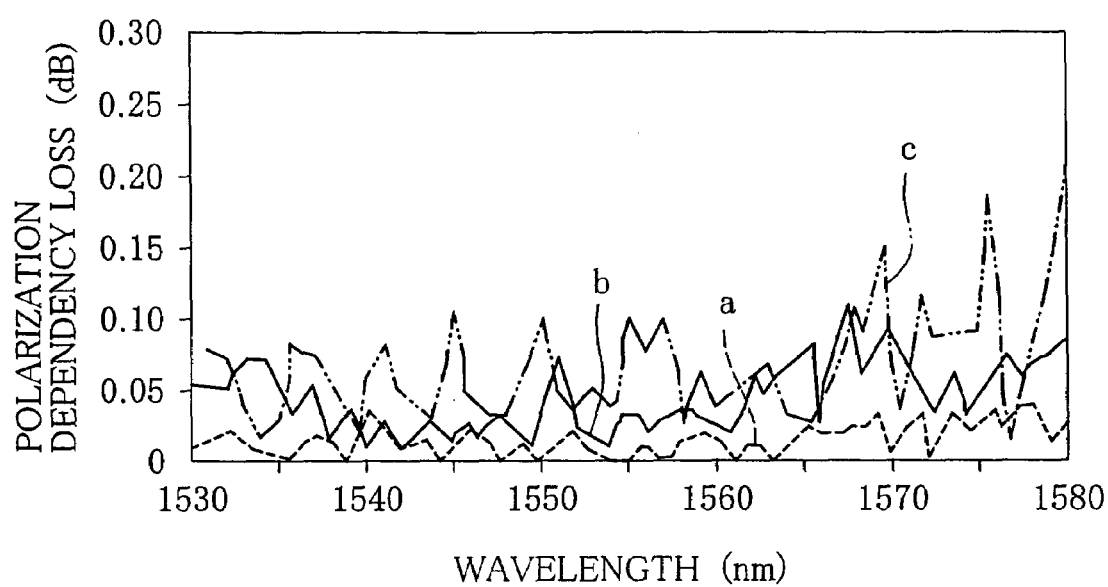
FIG. 9 is a graph showing the polarization dependency loss characteristic of the optical attenuation in the variable optical attenuator of FIGS. 6A and 6B.

In addition, the variable optical attenuator according to the present invention was examined for polarization dependency losses at wavelengths. Specifically, in view of the fact that the variable optical attenuator shown in FIGS. 6A and 6B had an insertion loss of 0.3 dB, polarization dependency losses were measured for across the range of wavelengths of 1530 nm and 1580 nm, with optical attenuations falling between the foregoing value of −0.3 dB and a value of −31.2 dB which was obtained when 100 V was applied to the actuators 7a and 7b. Here, the coupling efficiency between the first optical fiber 3 and the second optical fiber 4 could be changed without the diffraction effect due to the shutter plate 21 since the optical mode field was not interrupted by the shutter plate 21 as in the conventional variable optical attenuator shown in FIG. 4A above. In result, as shown in FIG. 9, the polarization dependency losses in this wavelength range were suppressed to approximately 0.2 dB or less at any of the attenuations around 10 dB (characteristic line a), 20 dB (characteristic line b), and 30 dB (characteristic line c).

As has been described, according to the variable optical attenuator of the present embodiment, the first lens 8 and the second lens 9 constituting the lens system having an optical axis coincident with those of the first and second optical fibers 3 and 4 are moved by the lens moving means including the actuators 7a and 7b, in opposite directions along the optical axis by the same amount at the same time. This makes it possible to change the spot size of the light incident on the optical fiber on the reception side while maintaining the light propagating between the first optical fiber 3 and the second optical fiber 4 point-symmetric in mode field shape. As a result, it becomes possible to change the coupling efficiency between the first optical fiber 3 and the second optical fiber 4 for an adjustment in light power.

In this way, the optical attenuation can be freely controlled to attain an optical attenuation of –30 dB or higher. It is also possible to reduce the wavelength dependence of the optical attenuation significantly as compared to the cases of the conventional variable optical attenuators shown in FIGS. 3A and 4A above.

Unlike the conventional variable optical attenuator shown in FIG. 4A above in which the optical mode field is interrupted by the shutter plate 21, there is no chance of being affected by the diffraction resulting from the shutter plate 21, nor any diffraction other than that of spreading out as a Gaussian beam. Therefore, the mode field shape point-symmetric about the optical axis can be maintained in the lens system, with a drastic suppression of the occurrence of polarization dependency losses.

Since the optical absorption film 12 is not used as in the conventional variable optical attenuator shown in FIG. 2 above, it is possible to withstand high optical input power.

The first and second lenses 8 and 9 formed by using semiconductor microfabrication technologies are erected upright on the silicon substrate 1 via the hinges 5 and 6 which are also formed by using semiconductor microfabrication technologies. Therefore, it is possible to support the lens system consisting of the first and second lenses 8 and 9 with precision and achieve the miniaturization of the apparatus as well.

The lens system consisting of the first and second lenses 8 and 9 is moved with electrostatic forces by using the lens moving means including the actuators 7a and 7b. Therefore, the fiber-end-to-lens distances can be controlled with accuracy, to attain, by extension, optical attenuations of favorable control characteristics. In addition, the use of MEMS for the lens moving means eliminates the need for a motor or other moving means as in the conventional variable optical attenuator shown in FIG. 2 above. This can contribute to further miniaturization of the apparatus.

Moreover, the first and second optical fibers 3 and 4 are fixed to the V grooves 28 and 29 formed in the silicon substrate 1, respectively. Thus, the optical axes of these first and second optical fibers 3 and 4 can be aligned to each other with facility and with precision.

Consequently, the variable optical attenuator according to the present embodiment can be installed, for example, in an optical amplifier for wavelength division multiplexing transmission with the function of uniformizing multi-wavelength light to a desired power collectively, satisfying all the requirements as a variable optical attenuator for smoothing amplification characteristics.

Incidentally, the present invention is not limited to the embodiment described above, and may be practiced in various forms.

The foregoing embodiment has been configured so that the first and second lenses 8 and 9 are moved with electrostatic forces by using the lens moving means including the actuators 7a and 7b. Nevertheless, microelectromagnets may be formed by micromachining technologies including a magnetic film deposition process and an etching process, so as to constitute an electromagnetic drive system in which the first and second lenses 8 and 9 are moved with electromagnetic forces from the microelectromagnets. Even in this case, it is possible as in the foregoing embodiment to control the fiber-end-to-lens distances accurately and, by extension, control the optical attenuation with precision, as well as to contribute to further miniaturization of the variable optical attenuator.

Moreover, the foregoing embodiment has used the lens system consisting of the first and second lenses 8 and 9. Nevertheless, the number of lenses to constitute the lens system is not limited to two, and shall be set as appropriate. For example, a single lens is applicable. Three or more lenses may be used. The size and shape of the lens(es) are not limited in particular, and shall be set as appropriate. Besides, the moving distance of the lens(es) such as the first and second lenses 8 and 9 is not limited in particular, and shall be set as appropriate. For example, when the lens system consists of a single lens, the variable optical attenuator can be advantageously simplified in configuration.

Furthermore, the foregoing embodiment has used the first and second optical fibers 3 and 4 as the first and second optical parts. Nevertheless, either one of the first and second optical parts may be an optical part other than an optical fiber. Both may be optical parts other than optical fibers.

In the foregoing embodiment, the actuators 7a and 7b move the first and second lenses 8 and 9 along the respective axes of the first and second optical fibers 3 and 4. Alternatively, the variable optical attenuator of the present invention may include, instead of the actuators 7a and 7b, actuators 40a and 40b, shown in FIGS. 10A and 10B, which move the first and second optical fibers 3 and 4 along the respective optical axes of the first and second lenses 8 and 9.

In this case, the first and second optical fibers 3 and 4 are movably received in respective V grooves 28 and 29 cut in the silicon substrate 1, and the actuators 40a and 40b move the corresponding optical fibers independently or in a coordinated manner along the respective optical axes of the first and second lenses 8 and 9. Where the movements of the first and second optical fibers 3 and 4 are coordinated, the optical fibers 3 and 4 are simultaneously moved in opposite directions by the same amount.

Like the aforementioned actuators 7a and 7b, the actuators 40a and 40b are formed on the silicon substrate 1 by using semiconductor microfabrication technologies.

Instead of using the actuators 40a and 40b, linear motors (not shown) may be used to move the first and second optical fibers 3 and 4, respectively.

Figures 10A, 10B:
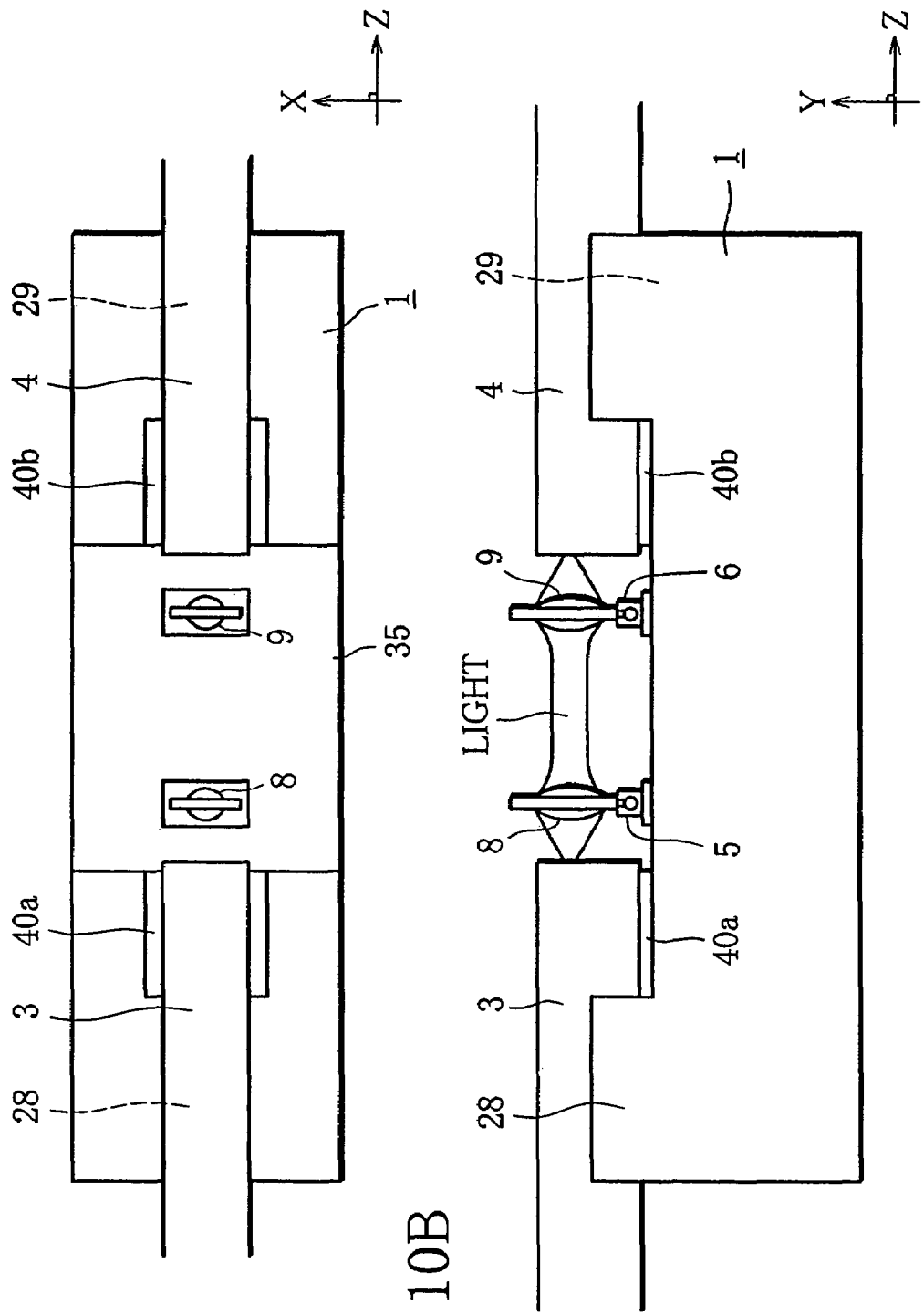
FIG. 10A is a plan view of a variable optical attenuator according to a modification of the present invention.
FIG. 10B is a side view of the attenuator of FIG. 10A.

Also in the case where the first and second optical fibers 3 and 4, instead of the first and second lenses 8 and 9, are moved as in the variable optical attenuator of FIGS. 10A and 10B, functions and advantages similar to those of the attenuator of FIGS. 6A and 6B can be achieved.

What is claimed is:

1. A variable optical attenuator comprising:
   a first optical part;
   a second optical part opposed to said first optical part with a predetermined gap therebetween; and optical coupling efficiency adjusting means for adjusting a coupling efficiency between said first optical part and said second optical part while maintaining light propagating between said first optical part and said second optical part point-symmetric in mode field shape, wherein said optical coupling efficiency adjusting means adjusts the coupling efficiency between said first optical part and said second optical part for an adjustment in light power, wherein said optical coupling efficiency adjusting means includes:

a lens system arranged between said first optical part and said second optical part so that an optical axis thereof coincides with those of said first and second optical parts; and moving means for relatively moving a lens constituting said lens system along the direction of the optical axes of said first and second optical parts with respect to said first and second optical parts.

2. The variable optical attenuator according to claim 1, wherein said first optical part or said second optical part is an optical fiber.

3. The variable optical attenuator according to claim 1, wherein:

said lens system is composed of a first lens and a second lens arranged with a predetermined gap therebetween along the direction of the optical axes of said first and second optical parts; and said moving means moves said first lens and said second lens in opposite directions by the same amount at the same time.

4. The variable optical attenuator according to claim 1, wherein said lens system is composed of a single lens.

5. The variable optical attenuator according to claim 1, wherein said moving means moves said lens constituting said lens system with an electromagnetic force or an electrostatic force.

6. The variable optical attenuator according to claim 1, wherein:

said lens constituting said lens system is erected upright on a semiconductor substrate via a hinge; and said lens and said hinge are formed by using semiconductor microfabrication technology.

7. The variable optical attenuator according to claim 6, wherein said first optical part and said second optical part are fixed onto said semiconductor substrate.

8. The variable optical attenuator according to claim 1, wherein said moving means moves at least one of said first and second optical parts along the direction of the optical axis of said lens system.

9. The variable optical attenuator according to claim 8, wherein said lens system includes a first lens and a second lens arranged with a predetermined gap therebetween along the direction of the optical axis of said first and second optical parts; and said moving means moves said first and second optical parts in opposite directions by the same amount at a time.

10. The variable optical attenuator according to claim 9, wherein said moving means includes one of actuators for moving said first and second optical parts with an electromagnetic force or an electrostatic force and linear motors.

11. A variable optical attenuator comprising:

a first optical part;

a second optical part opposed to said first optical part with a predetermined gap therebetween; and optical coupling efficiency adjusting means for adjusting a coupling efficiency between said first optical part and said second optical part while maintaining light propagating between said first optical part and said second optical part point-symmetric in mode field shape, wherein said optical coupling efficiency adjusting means adjusts the coupling efficiency between said first optical part and said second optical part for an adjustment in light power, wherein said optical coupling efficiency adjusting means includes:

a lens system arranged between said first optical part and said second optical part so that an optical axis thereof coincides with those of said first and second optical parts; and moving means for relatively moving a lens constituting said lens system along the direction of the optical axes of said first and second optical parts with respect to said first and second optical parts; and wherein, where said attenuator has an optical attenuation of 31.2 dB, polarization dependent loss of said attenuator is suppressed to 0.2 dB or less in a wavelength range of from 1530 nm to 1580 nm both inclusive.

12. The variable optical attenuator according to claim 11, wherein said first optical part or said second optical part is an optical fiber.

13. A variable optical attenuator comprising:

a first optical part;

a second optical part opposed to said first optical part with a predetermined gap therebetween; and optical coupling efficiency adjusting means for adjusting a coupling efficiency between said first optical part and said second optical part while maintaining light propagating between said first optical part and said second optical part point-symmetric in mode field shape, wherein said optical coupling efficiency adjusting means adjusts the coupling efficiency between said first optical part and said second optical part for an adjustment in light power, wherein said optical coupling efficiency adjusting means includes:

a lens system arranged between said first optical part and said second optical part so that an optical axis thereof coincides with those of said first and second optical parts; and moving means for relatively moving a lens constituting said lens system along the direction of the optical axes of said first and second optical parts with respect to said first and second optical parts; and wherein, where said attenuator has an optical attenuation of 30 dB, wavelength dependency of the optical attenuation is suppressed to 0.36 dB or less in a wavelength range of from 1530 nm to 1580 nm both inclusive.

14. The variable optical attenuator according to claim 13, wherein said first optical part or said second part is an optical fiber.

* * * * *